(12) United States Patent
Lewis et al.

(10) Patent No.: US 9,578,382 B2
(45) Date of Patent: *Feb. 21, 2017

(54) SUBSCRIBABLE CHANNEL COLLECTIONS

(71) Applicant: Google Inc., Mountain View, CA (US)

(72) Inventors: Justin Lewis, Marina Del Rey, CA (US); Joseph Daverin, South Pasadena, CA (US)

(73) Assignee: GOOGLE INC., Mountain View, CA (US)

( * ) Notice: Subject to any disclaimer, the term of this patent is extended or adjusted under 35 U.S.C. 154(b) by 785 days.

This patent is subject to a terminal disclaimer.

(21) Appl. No.: 13/927,397

(22) Filed: Jun. 26, 2013

(65) Prior Publication Data

US 2015/0007235 A1    Jan. 1, 2015

(51) Int. Cl.
   *G06F 17/00*    (2006.01)
   *H04N 21/482*    (2011.01)
   *H04N 21/462*    (2011.01)

(52) U.S. Cl.
   CPC ........ *H04N 21/482* (2013.01); *H04N 21/4622* (2013.01)

(58) Field of Classification Search
   CPC .......................... H04N 21/482; H04N 21/4622
   USPC ..................... 705/59, 14.4, 14.66, 52, 14.44, 14.45,705/14.56, 14.61, 14.68; 709/204, 206, 226, 709/231, 88.13; 707/706, 711, 781, 783, 791, 707/802, 822, 828; 715/760, 860; 725/56
   See application file for complete search history.

(56) References Cited

U.S. PATENT DOCUMENTS

| | | | |
|---|---|---|---|
| 4,769,772 A | 9/1988 | Dwyer | |
| 5,960,411 A | 9/1999 | Hartman et al. | |
| 6,104,398 A | 8/2000 | Cox, Jr. et al. | |
| 7,783,592 B2 | 8/2010 | Armstrong et al. | |
| 7,979,803 B2 | 7/2011 | Kim et al. | |
| 8,190,997 B2 | 5/2012 | Shellen et al. | |
| 8,230,347 B2 | 7/2012 | Cwajbaum | |
| 8,230,361 B2 | 7/2012 | Goldberg et al. | |
| 8,626,794 B2 * | 1/2014 | Liao .................... | G06F 21/6227 707/791 |

(Continued)

FOREIGN PATENT DOCUMENTS

WO        2005055603        6/2005

OTHER PUBLICATIONS

International Searching Authority, "Notification of Transmittal of the International Search Report and the Written Opinion of the International Search Authority, or the Declaration," for International Application No. PCT/US2014/044461, mailed Oct. 14, 2014, 17 pages.

*Primary Examiner* — McDieunel Marc
(74) *Attorney, Agent, or Firm* — Lowenstein Sandler LLP

(57) ABSTRACT

A system for creating and maintaining subscribable channel collections includes a computer-readable storage medium having encoded thereon a program of instructions for generating and maintaining channel collections, and a processor that executes the program of instructions to: display a channel collection configuration interface, receive two or more channel selections through the channel collection interface to populate a channel collection to include multiple channels, one or more of the multiple channels comprising multiple content items, using a channel creation operation, create a subscribable, channel collection, and receive a subscription request from a media device and using a channel collection subscription operation, create a channel collection subscription linked to the media device.

20 Claims, 7 Drawing Sheets

(56) References Cited

U.S. PATENT DOCUMENTS

| | | | |
|---|---|---|---|
| 8,725,770 B2* | 5/2014 | Koide | G06F 21/6218 707/706 |
| 8,850,490 B1* | 9/2014 | Thomas | H04N 21/47211 725/109 |
| 9,253,541 B2* | 2/2016 | Lewis | G06F 3/04842 |
| 2002/0002488 A1* | 1/2002 | Muyres | G06F 21/10 705/14.56 |
| 2002/0004744 A1* | 1/2002 | Muyres | G06F 21/10 705/14.4 |
| 2003/0095153 A1 | 5/2003 | Bosma et al. | |
| 2004/0111478 A1* | 6/2004 | Gross | H04L 51/00 709/206 |
| 2006/0212904 A1 | 9/2006 | Klarfeld et al. | |
| 2006/0271876 A1 | 11/2006 | Holmes et al. | |
| 2006/0277481 A1 | 12/2006 | Forstall et al. | |
| 2007/0038712 A1 | 2/2007 | Affronti et al. | |
| 2007/0077921 A1 | 4/2007 | Hayashi et al. | |
| 2008/0082941 A1 | 4/2008 | Goldberg et al. | |
| 2008/0109529 A1 | 5/2008 | Story | |
| 2008/0141136 A1 | 6/2008 | Ozzie et al. | |
| 2008/0320139 A1 | 12/2008 | Fukuda et al. | |
| 2009/0013266 A1 | 1/2009 | Gandhi et al. | |
| 2009/0019063 A1 | 1/2009 | Gandhi et al. | |
| 2009/0043907 A1* | 2/2009 | Peterson | G06F 3/0236 709/231 |
| 2009/0083761 A1 | 3/2009 | Mully | |
| 2009/0150406 A1 | 6/2009 | Giblin | |
| 2009/0322790 A1 | 12/2009 | Behar et al. | |
| 2010/0042948 A1 | 2/2010 | Kim et al. | |
| 2010/0049603 A1* | 2/2010 | Peterson | G06Q 30/02 705/14.45 |
| 2010/0076818 A1* | 3/2010 | Peterson | G06Q 30/0245 705/59 |
| 2010/0082650 A1 | 4/2010 | Wong | |
| 2010/0125584 A1 | 5/2010 | Navas | |
| 2011/0137894 A1 | 6/2011 | Narayanan et al. | |
| 2011/0179020 A1 | 7/2011 | Ozzie et al. | |
| 2011/0197146 A1 | 8/2011 | Goto et al. | |
| 2012/0054278 A1 | 3/2012 | Taleb et al. | |
| 2012/0304219 A1 | 11/2012 | Olague et al. | |
| 2014/0337139 A1* | 11/2014 | Thomas | G06Q 30/0269 705/14.66 |

* cited by examiner

SUBSCRIBABLE CHANNEL COLLECTIONS

BACKGROUND

Videos as media objects of interest to a large and broad spectrum of individuals may be shared using video sharing services and social networks, for example. Videos may be delivered using dedicated video delivery systems. Other video sharing and video delivery options are possible. Videos may be shared or delivered through entities. In an aspect, an entity is a mechanism that organizes provides a convenient means for organizing and categorizing videos dedicated to a specific topic, to a similar theme, or that have some identifiable relationship, for example. Viewers may subscribe to one or more entities, and using this subscription readily may view videos of interest. Viewers who subscribe to specific entities may watch a larger number of videos than viewers who do not subscribe to specific entities and who only randomly watch videos. However, viewers who are subscribed to a large number of entities may encounter problems keeping their entity subscriptions organized. In addition, subscribers may encounter problems trying to discover new entities.

SUMMARY

A system for creating and maintaining subscribable channel collections includes a computer-readable storage medium having encoded thereon a program of instructions for generating and maintaining channel collections, and a processor that executes the program of instructions to: display a channel collection configuration interface, receive two or more channel selections through the channel collection interface to populate a channel collection to include multiple channels, one or more of the multiple channels comprising multiple content items, using a channel creation operation, create a subscribable, syndicatable channel collection, and receive a subscription request from a media device and using a channel collection subscription operation, create a syndicatable channel collection subscription linked to the media device.

A method, executed on a processor, for creating, maintaining, and syndicating a channel collection, includes displaying a channel collection configuration interface; receiving two or more channel selections through the channel collection interface to populate a subscribable, syndicatable channel collection comprising multiple channels, one or more of the multiple channels comprising multiple content items; executing a channel collection creation operation including: associating a unique address with the channel collection, and writing the unique address and metadata for each selected channel in the channel collection to a persistent data store; receiving a subscription request from a media device and using a subscription operation: creating a channel collection subscription, comprising all channels identified currently and in a future time to the channel collection, linked to the media device, and storing the channel collection subscription in the persistent store; receiving an updated configuration of channels to the channel collection; and automatically syndicating the update to all subscribers to the channel collection.

A computer-readable storage medium having encoded thereon instructions executable by a processor to create, maintain, and syndicate a channel collection to a plurality of viewers, wherein the instructions when executed cause the processor to: display a channel collection configuration interface; receive two or more channel selections through the channel collection interface to populate a channel collection, the channel collection comprising multiple channels, one or more of the multiple channels comprising multiple content items; associate a unique address with the channel collection; write the unique address and information for each selected channel in the channel collection to a persistent data store; receive a subscription from a media device and create a channel subscription linked to the media device; receive an updated configuration of channels to the channel collection; and make the update available to all subscribers to the channel collection.

A system for generating and maintaining subscribable channel collections, includes means for storing a program of instructions for generating and maintaining a channel collection and means for executing the instructions. The program of instructions includes means for displaying a channel collection configuration interface, means for receiving two or more channel selections through the channel collection interface to format a subscribable, syndicatable channel collection, channel creation means for creating the subscribable, syndicatable channel collection, means for receiving a subscription request from a media device, and channel collection subscription means for creating a syndicatable channel collection subscription linked to the media device.

DESCRIPTION OF THE DRAWINGS

The detailed description refers to the following Figures in which like numbers refer to like items, and in which.

DETAILED DESCRIPTION

Figure 1:
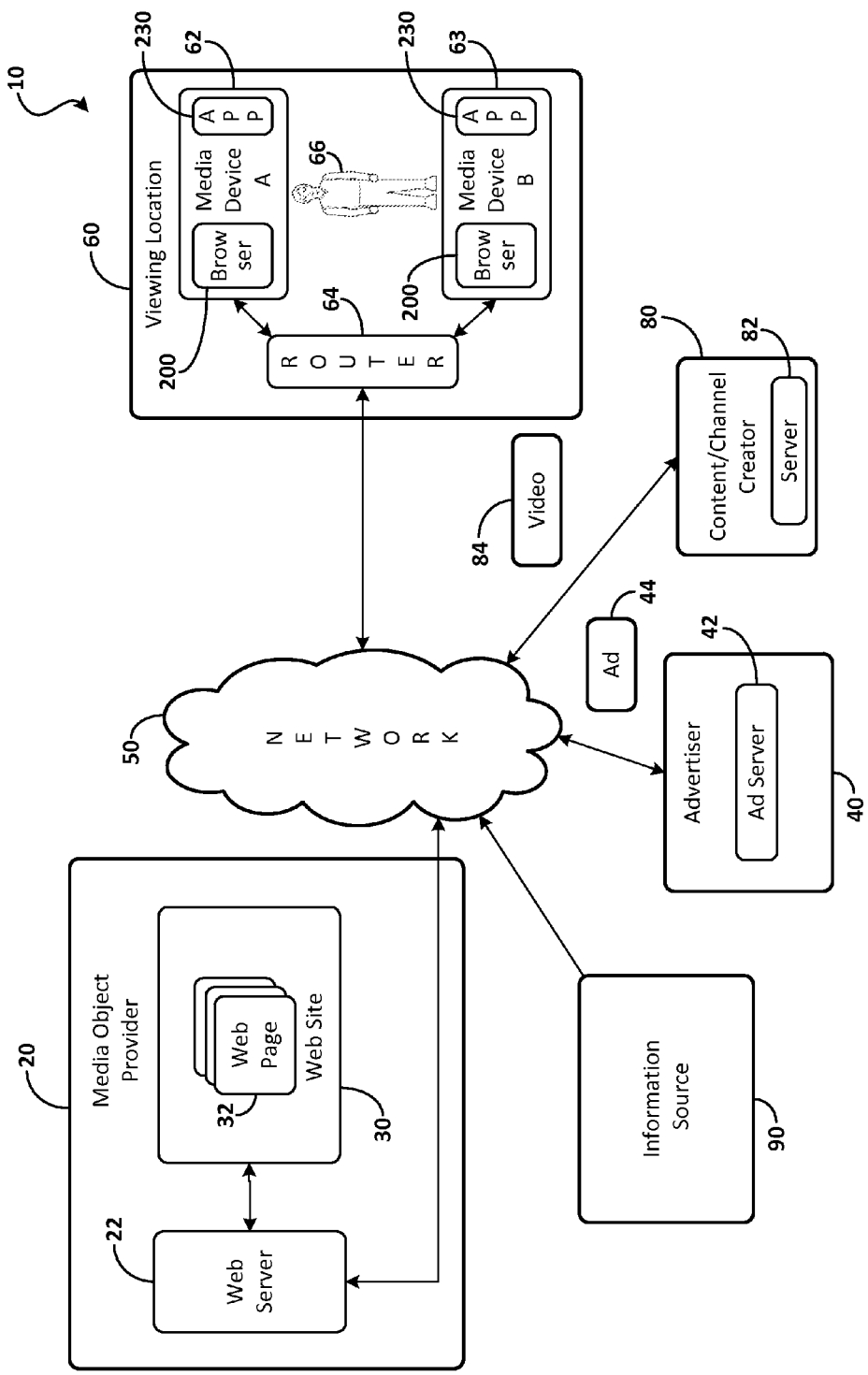
FIG. 1 illustrates an example environment that supports channel collection subscriptions.

Individuals may have access to a diverse and extensive accumulation of content items/media objects that they may view, share with other individuals, and with which they may otherwise interact. A media object may use any content format that an individual (human) may perceive. Media objects may include videos (real life and animated; silent and with audio); video games; still images such as photographs and drawings; audio compositions such as songs; blogs; text messages; documents, including Web pages, and any other form of content that may be delivered electronically over a communications network. The media objects may be created by individuals or by suitably programmed computing devices. The media objects may be organized or assembled according to a topic, theme, source, or other relationship. An assemblage of media objects may be established and maintained by an individual and/or by a suitably programmed computing device.

Media objects may be assembled using a variety of mechanisms. For example, social media services may use a profile mechanism; Internet-based content delivery services may use a Web page mechanism and/or an entity or a channel mechanism.

As used herein, a channel is an assemblage of one or more media objects. For example, a channel may be an assemblage of media objects from a common source or relating to a common topic or theme. In some embodiments, an individual may subscribe to a channel or otherwise follow assembled media objects. By subscribing to a channel, the individual may have an opportunity to view or otherwise experience activity that happens within the subscribed-to channel.

The common source may be, for example, a video network, a video delivery system, a video sharing service, a social network, individuals, and any other individual, group of individuals, user, or organization that is capable of assembling, and in some instances maintaining, the media objects in channels. In an embodiment, the common source provides access to media objects using the Internet.

For simplicity, the description that follows primarily refers to videos as media objects. However, as noted above, media objects may include any form of content that may be perceived by an individual.

Videos as media objects may be categorized, assembled, grouped, organized, provided, and shared using video sharing services and social networks, for example. Videos may be delivered using dedicated video delivery systems. Other video sharing and video delivery options are possible. Videos shared or delivered may be categorized, assembled, grouped and organized into channels. In one aspect, such channels provide a convenient mechanism for organizing videos dedicated to specific topics or themes, for example. Individuals may subscribe to one or more channels, and using this channel structure may view videos of interest. Individuals who subscribe to specific video channels may watch more videos than viewers who only randomly view videos. Individuals who are subscribed to channels (i.e., subscribers) may watch more videos and may visit a video delivery system's Web site more frequently than individuals who are not subscribed. This more frequent video viewing behavior provides monetization opportunities for the video delivery system. However subscribers to large numbers of channels may encounter problems keeping their channel subscriptions organized. In addition, subscribers may encounter problems trying to discover new video channels. Finally, video suppliers or publishers may need a convenient, reliable mechanism to deliver or share videos with subscribers.

To alleviate problems associated with organizing and maintaining groups of video channels, disclosed herein are systems and methods for creating and maintaining channel collections as a single subscribable group. In an aspect, video delivery and video sharing sites may use the systems and methods to improve video channel organization, increase subscriptions, and increase the number of available video channels and hence the number of video channel views and other activity. With the herein disclosed systems and methods, a channel collection operates as a distinct, subscribable group, and after subscription, changes to the channel collection are reflected, or syndicated, for all individuals subscribed to the channel collection. Thus, the herein disclosed systems and methods allow creation of a subscribable, syndicatable channel collection that includes any number of individual channels. In an embodiment, the channel collections may be created through a one-click operation, and subscriptions to the channel collection also may be made through a one-click operation. That is, a subscriber may subscribe to a channel collection, which provides the subscriber access to multiple channels, and allows the subscriber to receive automatic updates to the channel collection as channels are added and deleted from the channel collection. Furthermore, with the herein disclosed systems and methods, individuals may be better able to discover new channels, and content/channel collection creators may be assured of reaching larger audiences.

In an aspect, the herein disclosed systems and methods provide for channel collections that are managed or maintained by a single owner or a group of owners. For example, a video delivery site may provide channel collections that are owned by one or more individuals. To support the herein disclosed methods, such a video delivery site may provide a threshold number of subscribable channels to make groups of channels (that is channel collections) useful and desirable.

Channel collections may make subscriptions easier to manage for both subscribers and for content/channel collection creators. On the one hand, if an individual wants to subscribe to, for example, all the recording artists in the top 40, with the herein disclosed systems and methods, the individual would be able to subscribe to an existing top-40 channel collection that would automatically update (i.e., through a syndication process) as the channels comprising the top-40 channel collection change. This update feature may generate more subscriptions, which in turn may lead to more video watch time.

Content/channel collection creators, on the other hand, may be able to create multiple channels and group the multiple channels together as a channel collection. Such an option may encourage content/channel collection creators to create more channels and more content. For example, a recording artist could create three channels, one channel each for music videos, a video log (vlog), and interviews. Each channel may have its own audience, but subscribing to each channel requires a repetitive effort from an individual, which may discourage creation of multiple channels. However, when the artist's multiple channels are grouped as a collection using the herein disclosed systems and methods, subscribing may be easier since a single subscription could allow access to multiple channels. This feature may encourage content/channel collection creators such as the artist to create more channels.

In another content/channel collection creator example, an individual could collect the channels of his favorite rock-style artists into a group of channels. That channel collection then may be publicized as a collection to which other individuals could subscribe. In an embodiment, the channel collection may be publicized by providing channel collection subscription suggestions to individuals accessing content in the persistent store or by providing channel collection subscription suggestions to social media contacts of existing subscribers. Changes the individual makes to the composition of channels in the channel collection then may be reflected automatically for other individuals who subscribe to the channel collection.

One common aspect of the above examples is that a subscriber to a channel collection receives automatic updates to the channel collection as the content/channel collection creator maintains, updates, and improves the channels included in the channel collection. That is, if a new channel is added to the channel collection, all channel collection subscribers receive the new channel automatically, without having to execute a separate and new channel subscription process.

This multiple channel subscription feature, and the corresponding automatic subscription update feature, allows increased subscriber retention and activity. That is, subscribers are more likely to stay subscribed to a channel collection, particularly since the channel collection may be updated with the updates passed automatically and directly to the channel collection subscribers.

Furthermore, the features help subscribers find new subscribable channels; enabling subscribers to interact with groups of channels at one time solves many discoverability issues that plague current social networking sites. In an aspect, the features allow a newly created channel, or a lesser-known channel to be associated with, or to piggy back onto a well-known and popular channel, thereby increasing viewing of content on the new or lesser-known channel. Still further, the features allow a subscriber to efficiently track and interact with a larger number of channels than would be possible without the features.

Furthermore, the channel collections may be stored in a persistent store and indexed to allow easy search and retrieval. In addition, a search for an individual channel may produce a list of all channel collections to which the channel belongs (a channel may be part of more than one channel collection). Moreover, channel collections may be arranged in hierarchies, and the hierarchical structure may be available to individual who access the persistent store.

By using the herein disclosed systems and methods, content/channel collection creators (i.e., channel group owners) may treat grouped channels as a single subscribable entity, which allows the content/channel collection creators to concentrate on curating the channels in the group, while channel collection subscribers benefit from the improved content that comes from curation without doing any curation work on their own. In an aspect, a content/channel collection creator, as an owner of a channel collection, may maintain the channel collection through a manual, automatic, or semi-automatic curation process. An automatic process, for example, may be used to curate a top-40 recording artists channel collection, where the composition of the channel collection changes periodically as different recording artists enter and leave a top-40 ranking established by an external source or rating service. The curation process allows content/channel collection creators to increase the volume and quality of subscriptions. Volume is increased by subscribing to groups of channels, and quality is increased because the curator of the channel collection can edit the channels in the channel collection for all subscribers. Channels that drop off in quality or stop publishing new content may be removed and new channels that publish content of interest to a large number of potential or existing subscribers may provide an affinity score of the channel collection based on subscriber inputs (like/dislike signals, keywords harvested from comments, declining subscription base, for example) and suggest to a creator of the channel collection, channel changes to improve the affinity score of the channel collection.

In another aspect, an individual or group of individuals other than, and possibly not related to the content/channel collection creator may perform or supervise the curation process.

In an embodiment, the herein disclosed systems and methods may allow a subscriber to choose either to subscribe to a channel collection without updating or to subscribe to a channel collection with updating as the channel collection is curated.

FIG. 1 illustrates an example environment that supports channel collection subscriptions, including subscriptions to collections of video channels. In FIG. 1, environment 10 includes media object provider 20, advertiser 40, media viewer 66 at viewing location 60, content/channel collection creator 80, and external information source 90, all of which may communicate over communications network 50. The media object provider 20 distributes media objects to media devices 62 and 63 operated by the viewer 66. The media object provider 20 receives media objects, which may be organized into channels and the channels organized into channel collections by the content/channel collection creator 80. Alternately, viewer 66 may provide the channel and/or channel organization to the media object provider 20. That is, the viewer 66 may select a number of, for example, favorite sports videos, name the videos as "my sports channel," and then group the "my sports channel" with other favorite channels to create a "my favorite video channels collection." The advertiser 40 provides advertisements that may be served in conjunction with display of media objects.

As noted above, the channel collection concept may apply to videos, animated media, still images, audio tracks, games, applications, Web sites, documents, social media posts, short message system (SMS) messages, emails, blogs; in short, the channel collection concept disclosed herein may apply to any electronic media form and any electronic content item/media object. However, for simplicity, the description that follows refers primarily to content items/media objects as videos, channels as sources of videos, and, and collections as groups of channels.

The media object provider 20 operates Web server 22, which hosts Web site 30. The Web site 30 may be an Internet search Web site; a social network Web site; a commercial Web site selling products and services, and providing information about the products and services; and an online service such as an online banking service or an online dating service. The Web site 30 includes Web pages 32. The Web server 22 provides links to enable navigation among the Web pages 32. The Web server 22 also may display, on any of the Web pages 32, links to other Web sites. The Web site 30 may display media objects (content and corresponding channels) created and provided by the content/channel collection creator 80. Alternately, the media object provider 20 may create channels from media objects. The media object provider 20 also may provide advertisements provided by advertiser 40.

The advertiser 40 operates ad server 42 to provide advertisements 44 (i.e., content segments) that are served on the Web pages 32. The advertiser 40 may represent a single company or entity, a group of related companies, or a group of unrelated companies (e.g., the advertiser 40 may operate as an ad broker). The advertiser 40 may operate the ad server 42 to provide one or more Web sites 48. The advertisements 44 provided for display on the Web pages 32 may be static advertisements or non-static advertisements. The advertisements 44 may include audio, video, and animation features. The advertisements 44 may be in a rich media format. The advertisements 44 may be displayed on a Web page 32 at the same time that a media object (video) is being displayed on the Web page 32. The advertisements 44 may be shown as an overlay to a video, before and/or after display of the video, and during pauses in the video. The advertisements 44 may be served in specific locations of the Web page 32 while the video is displayed in a different location of the Web page 32. The advertisements 44 may change during display of a video.

The network 50 may be any communications network that allows the transmission of signals, media, messages, voice, and data among the devices and systems shown in FIG. 1, including radio, linear broadcast (over-the-air, cable, and satellite) television, on-demand channels, over-the-top media, including streaming video, movies, video clips, and games, and text, email, and still images, and transmission of signals, media, messages, voice, and data from a media device to another media device, computer, or server. The network 50 includes the Internet, cellular systems, and other current and future mechanisms for transmission of these and other media. The network 50 may be both wired and wireless.

The viewing location 60 may be the residence of an individual viewer, such as viewer 66, who operates media devices 62 and 63 to access, through router 64, media objects such as videos at the Web site 30. The media devices 62 and 63 may be fixed or mobile. For example, media device 62 may be an Internet connected "smart" television (ITV); a "basic" or "smart" television connected to a set top box (STB) or other Internet-enabled device; a Blu-ray™ player; a game box; and a radio, for example. Media device 63 may be a tablet, a smart phone, a laptop computer, or a desk top computer, for example. The media devices 62 and 63 may include browsers, such as browser 200. The browser 200 may be a software application for retrieving, presenting, and traversing resources such as at the Web site 30. A resource may be identified by a Uniform Resource Locator (URL) and may be a Web site, Web page, image, video, or other content. A resource may be a channel or a channel collection. The URL may allow the browser 200 to connect to the Web site 30. Hyperlinks present in resources enable the viewer 66 to navigate the browser 200 to related resources. The viewer 66 may operate the browser 200 to search for Web sites related to specific topics or to search for a specific Web site by URL. The media devices 62 and 63 also may include applications 230. The viewer 66 may cause the media devices 62 or 63 to execute an application 230, such as a mobile banking application, to access online banking services. The application 230 may involve use of a browser or other means, including cellular means, to connect to the online banking services. Once connected to the Web site 30, the media devices 62 and 63 may allow viewing of content such as video programs and static images generated by the content/channel collection creator 80 (i.e., primary content) and displayed on the Web pages 32 at the Web site 30. The video programs and static images may include slots or spaces into which secondary content such as advertisements may be placed.

The content/channel collection creator 80 provides primary content (content items/media objects), in the form, for example, of videos 84, which may be displayed on the Web pages 32 and viewed, heard, or otherwise perceived by the viewer 66 using the media devices 62 and 63. The content/channel collection creator 80 may create, acquire, or identify (e.g., by URL) content items/media objects to be grouped into channels; the content/channel collection creator 80 then may group the channels as a collection of channels. The content/channel collection creator 80 may operate server 82 to communicate with the media object provider 20, and may include or access other hardware and software systems to create and maintain channel collections.

In addition to creating and/or grouping content items/media objects, the content/channel creator 80 may maintain, or curate, channels in a channel collection. For example, the content/channel collection creator 80 may add channels or delete channels from a channel collection. In an embodiment, the addition and deletion of channels to the channel collection may be automated. For example, a content/channel collection creator 80 may create a top-40 recording artists channel collection based on an independent rating system 90, and as individual recording artists appear and disappear from the top-40 list, the channels in the channel collections change accordingly.

The content/channel collection creator 80 may be an individual (e.g., a recording artist), a group of individuals, or an organization (e.g., a movie studio that produces trailers for upcoming movies), or as noted, an individual viewer 66. The content/channel collection creator 80 may be a network such as a game channel network that creates video games, video game trailers, and associated content, and places the content in two or more separate channels organized as a collection.

In an aspect, only the content/channel collection creator 80 is enabled to maintain or curate a channel collection that it creates.

In an aspect, once a viewer 66 subscribes to a channel collection, the viewer 66 may add channels to the channel collection. In this aspect, the channels added by the viewer 66 would be reflected only in a version of the channel collection available to the viewer 66; that is, a new channel collection is created. In another aspect, only the content/channel collection creator 80 may add (and also subtract) channels to (from) the channel collection, or combine or split existing channels. In this aspect, channel additions/subtractions merges/splits affect all viewers 66 subscribing to the channel collection.

In the above content/channel creator examples, the content/channel collection creator 80 may assign the channel collections to the media object provider 20 to provide a mechanism for distributing the content and acquiring subscriptions. However, the content/channel collection creator 80 still may manage and curate the channel collections.

In an embodiment, in order to create a subscribable channel collection, the content/channel collection creator 80, or viewer 66, or any other individual, group of individuals, or organization, may be required to have a publicly-visible identity or presence, such as an IP address, domain name, or similar identity. This publicly-visible identity allows viewers 66 to search for and identify content (media objects), channels, and channel collections. In an embodiment, a viewer 66 may subscribe to a channel collection but may not be able to produce a channel collection. In another embodiment, to subscribe to a channel collection, a viewer 66 also may need a publicly-visible identity. With a publicly-visible identity, the viewer 66 may be able to interact with the media objects, channels, and channel collections. For example, such a viewer 66 may register likes and dislikes, post a comment, and share the channel collection with other viewers 66. However, without a publicly-visible identity, a viewer 66 still may be able to view videos in a channel collection. In some examples, a viewer 66 may have multiple publicly-visible identities. For example, a viewer 66 may be signed on to a video sharing service such as the media object provider 20, a social networking site, and an email account, and any channel collection subscribed to by that viewer 66 may be related to all signed-on services.

In an aspect, a viewer 66 may elect to subscribe to an entire channel collection. Alternately, the viewer may elect to subscribe to only a subset of channels in a channel collection.

Figure 2:
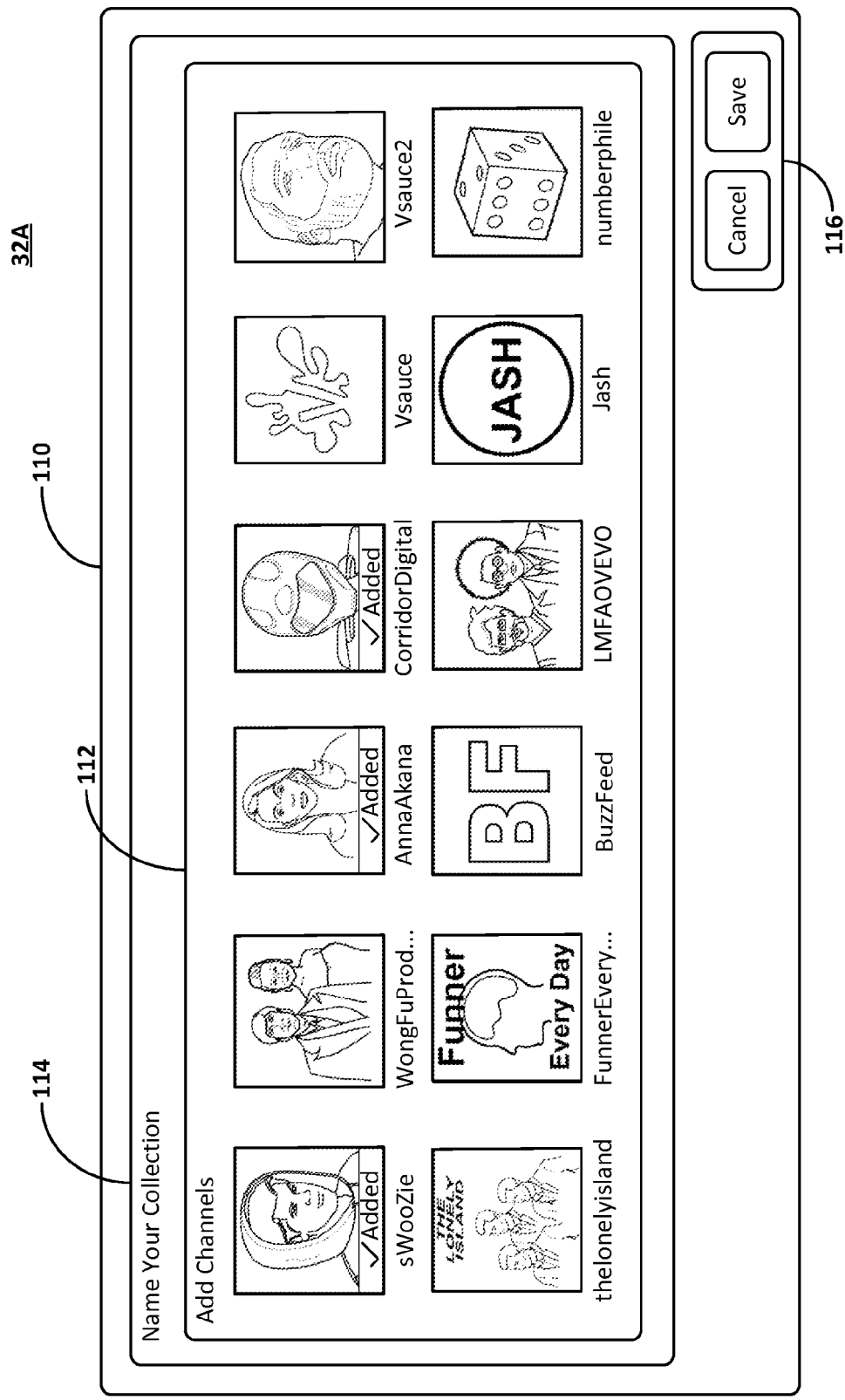
FIG. 2 illustrates an example document that supports channel collection creation, maintenance, and subscription.

FIG. 2 illustrates an example document that supports video subscriptions and channel collections. The document may be generated by the Web server 22 of FIG. 1 and may provide an electronic, interactive user-interface that allows individuals such as the viewer 66 or other content/channel collection creator to generate and maintain channel collections and to share the channel collections with other individuals.

In FIG. 2, Web page 32A illustrates a grouping of channels 110 selected, for example, by viewer 66. As can be seen in the example of FIG. 2, the grouping of channels includes twelve channels, each identified by a channel icon or thumbnail and a corresponding channel name, which may be truncated to fit into the display window provided by the Web page 32A. The viewer 66 may select the grouping of channels 110 by clicking on a channel icon on a Web page associated with the channel. Such Web pages may be accessed using Add Channels button 112, which allows the viewer 66 to search for channels or to enter a specific channel identity. Other means for selecting channels are possible. in an embodiment, the grouping of channels 110 includes a Name Your Collection window 114 that allows the viewer 66 to enter a name for the channel collection. Alternately, the channel collection name is generated automatically. A Save/Cancel button 116 allows the viewer 66 to save the channels displayed in the grouping of channels 110 with the name entered in the window 114.

The Web page 32A also may be used to modify an existing channel collection. For example, a content/channel collection creator may, using a drag and drop operation for example, merge two thumbnails displayed in the grouping of channels 110 to create a merged, or combined channel. In one aspect, the resulting thumbnail may be a new thumbnail or the thumbnail for the dragged-and-dropped channel. The content/channel collection creator also may split an existing channel into two or more channels, merge two or more channels, add a channel, or delete a channel.

The content/channel collection creator may use the Web page 32A to indicate that no changes to the channel configuration are permitted unless made by the content/channel collection creator. That is, viewers 66 would be prevented from changing the channel collection.

Figure 3A:
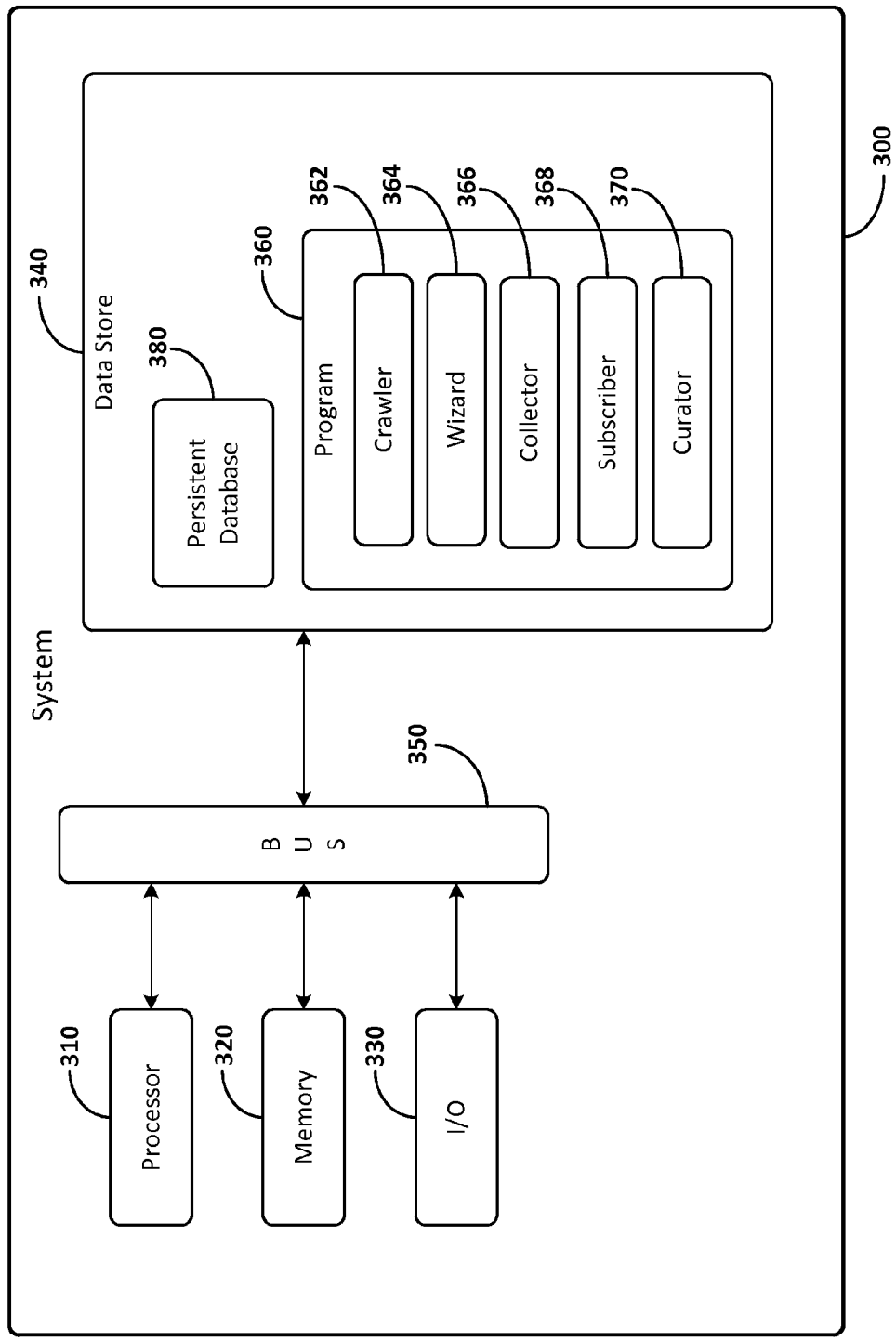
FIG. 3A illustrates an example system that supports channel collection creation, maintenance, and subscription.

FIG. 3A illustrates an example system that supports video subscriptions and channel collections. In FIG. 3A, system 300 is implemented on Web server 22 of FIG. 1. However, all or parts of the system 300 may be implemented on physically and/or virtually separated servers. Furthermore, the system 300 may be replicated, in relevant part, in multiple physically and/or virtually separated servers to improve efficiency and speed of operation through parallel processing. Thus, aspects of the system 300 may be implemented in a distributed computing network and the system 300 may allow for distributed hosted services of the media object provider 20.

A specific instance of the system 300 may include processor 310, memory 320, input/output 330, and data store 340, all connected together by data and communications bus 350. The data store 340 may be a non-transitory computer-readable storage medium. The data store 340 may include program 360, which is loaded into memory 320 by the processor 310 and then executed to provide for creation of channel collections. The data store 340 may include channel collection database 380. The input/output 330 allows for communications with other machines, such as the servers 22, 42, and 82, and the browsers 200 (see FIG. 1) and with human operators.

The program 360 includes content/channel crawler 362, channel collection wizard 364, channel collector 366, channel collection subscriber 368, and channel curator 370. When executing the program 360, the processor 310 may read from and write to the database 380 and the memory 320.

The content/channel crawler 362 accesses Internet Web sites to identify media objects that may be candidates for addition to existing channels and to identify channels that may be candidates for addition to channel collections. In an embodiment, the system 300 may provide prompts or suggestions to content/channel collection creators to add channels to channel collections.

The channel collection wizard 364 may review the subscription history of individual viewers 66 and provide suggestions for adding channel collections to the viewer's channel collection lists.

The channel collector 366 creates channel collections based on inputs from content/channel collection creators. For example, the channel collector 366 may link various channels identified by a content/channel collection creator to form a channel collection, and may store the channel collection in the database 380. The channel collector 366 also enables individual viewers 66 to add channels to a channel collection created by a different individual, and thereby create a new channel collection.

The channel collection subscriber 368 enables viewers 66 to subscribe to channel collections. For example, the channel collection subscriber 368 may provide a subscribe button associated with an existing channel collection to enable one-click subscription to multiple channels.

The curator 370 enables content/channel collection creators to maintain and improve channel collections. In an embodiment, the curator 370 enables automatic updating of a channel collection, such as the top-40 channel collection described above. Changes to a channel collection thereafter may be syndicated to existing channel collection subscribers.

The database 380 stores channel collections and related information, data and metadata, channels, videos, and other content. The database 380 is a persistent store that may be accessed by viewers 66 who subscribe to services provided by the media object provider 20.

Figure 3B:
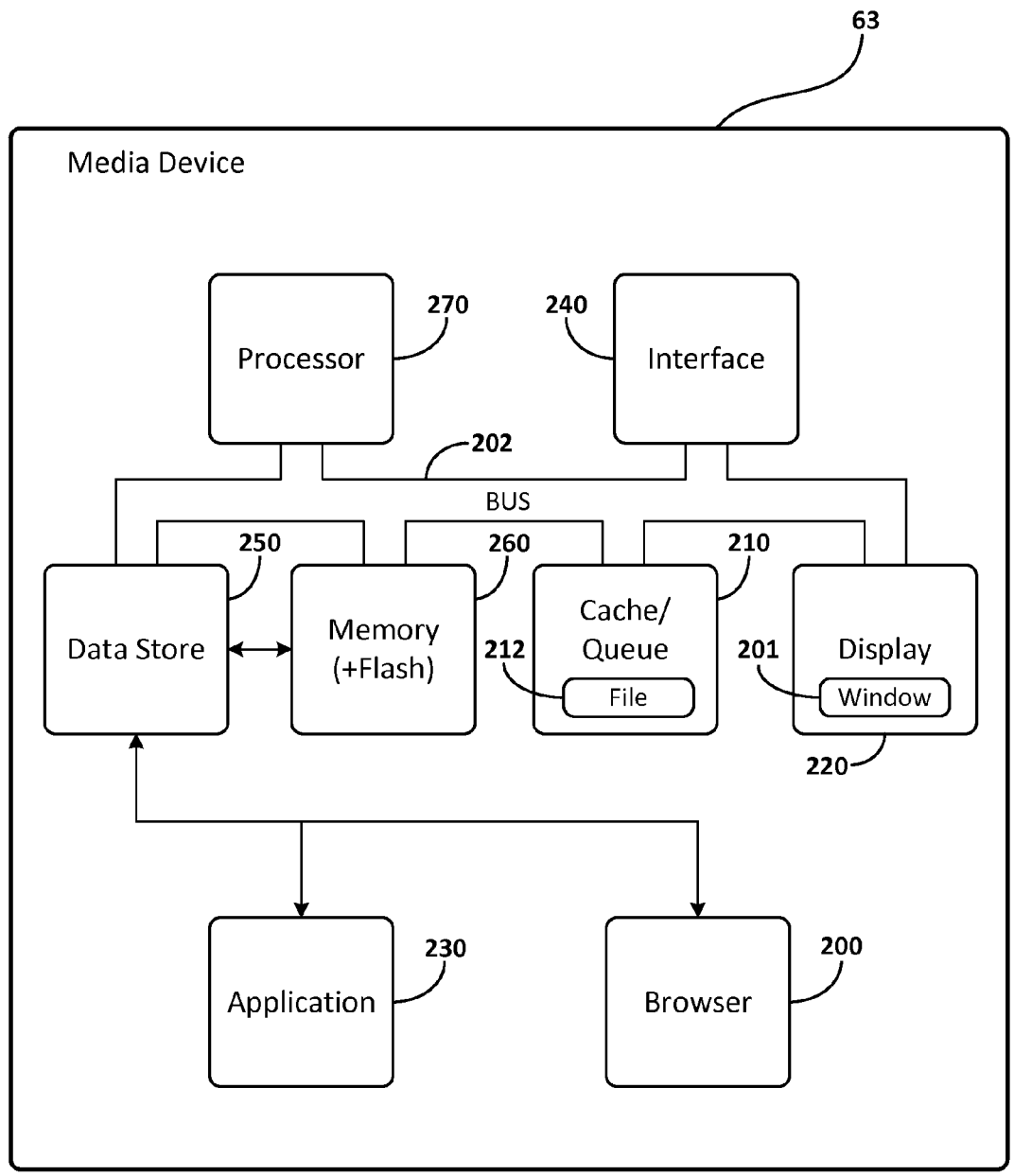
FIG. 3B illustrates an example media device that enables channel collection subscriptions.

FIG. 3B illustrates an example media device that enables subscriptions to channel collections. In FIG. 3B, media device 63 includes browser 200, cache/queue 210, display 220, application 230, interface 240, data store 250, memory 260, and processor 270. The processor 270, interface 240, data store 250, memory 260, cache 210, and display are connected by communications and data bus 202. The browser 200 may be a software program for retrieving, presenting, and traversing resources such as at the Web site 30. The browser 200 may be stored in the data store 250 and loaded into memory 260 by the processor 270. Hyperlinks present in resources enable the viewer 66 to navigate the browser 200 to related resources. When operating browser 200, the viewer 66 may scroll up or down, left or right, in order to view the entire Web page 32. The browser 200 enables the viewer 66 to access, retrieve and view content, media objects, and other resources on the Internet. The browser 200 also may be used to access information provided by Web servers in private networks or files in file systems.

The browser 200 may include computer code to store a file 212 in cache/queue 210 and record viewer actions. The browser 200 may store information related to Web site visits, including the URL of the Web site, date and time of visit, length of visit (or start and stop time of visit), and actions taken by the viewer 66 during the visit.

In an example, when a viewer 66 visits the Web site 30 (or uses an application 230) the file 212 may store a random ID of the browser 200 and no other Web site data. In this example, the contents of the file 212 may be provided to the media object provider 20 by way of the Web server 22. If the viewer 66 logs on to the Web site 30, the Web server 22 may use this log on to correlate the viewer 66 with the random ID, and may use this correlation when, for example, suggesting channel collections for subscription by the viewer 66.

The cache/queue 210 stores information related to operation of the browser 200. The information may include the URLs of the Web pages 32, as well as other data.

The display 220 includes programming and hardware aspects that provide a display screen or browser window 201 and the programming and hardware to display the content, content segment references, and data and information stored in the cache 210.

The application 230 may be installed on the media device 63 to perform a specific function. For example, the application 230 may be a mobile banking application. The application 230 may be stored in the data store 250 and loaded into memory 260 and executed by the processor 270.

The interface 240 includes a data entry device such as a keyboard, a mouse, a speaker, and a voice command input such as a microphone. Operation of the interface 240 may provide the viewer 66 with audio and visual features. The interface 240 also includes programming aspects such as scrolling features that allow the viewer 66 to change a position of the displayed Web page 32 relative to the display 220 and the browser window 201.

The data store 250 is or includes a non-transitory computer-readable storage medium. The data store 250 may be embodied in many forms, such as a hard disk drive, a magnetic disk drive, an optical disk drive, a tape drive, or another type of computer-readable media which can store data that are accessible by the processor 270. The data store 250 may store programming to operate the media device 63 and applications that execute on the media device 63.

The memory 260 stores the above-mentioned programming and other programming such as an operating system (not shown) for execution by the processor 270 to operate the media device 63.

When visiting the Web site 30, the viewer 66 may register with and log on to the Web site 30 by providing a viewer-created identification (hereafter, a user ID) and a password and/or pass code, for example. Alternately, the viewer 66 may access the Web site 30 without registering and without logging on. Whether or not logged on, the viewer 66 may access channel collections and view videos at the Web site 30. However, by logging on, the viewer may access additional features of the system 300, including, for example the ability to create and modify channel collections.

When using an application 230, the viewer 66 may make various selections that also may be recorded by the Web server 22. Similar to the browser 200, the application 230 may store in file 212 viewer identification information, Internet address information, and other data and information related to use of the application 230.

The methods executed by the herein disclosed system 300 of FIG. 3A and devices such as the media device 63 of FIG. 3B involve use of information that in some respect identifies a device the viewer 66 uses to access the Internet-based content. For example, when a viewer 66 uses an Internet browser to access a Web site, a Web server may create a random identification (ID) that identifies the browser and may cause the random ID to be stored on the viewer's device.

In situations in which the systems disclosed herein collect personal information about viewers, or may make use of personal information, the viewers may be provided with an opportunity to control whether programs or features collect viewer information (e.g., information about a viewer's social network, social actions or activities, profession, a viewer's preferences, or a viewer's current location), or to control whether and/or how to receive advertisements from an ad server that may be more relevant or of interest to the viewer. In addition, certain data may be treated in one or more ways before it is stored or used, so that personally identifiable information is removed. For example, a viewer's identity may be treated so that no personally identifiable information can be determined for the viewer 66, or a viewer's geographic location may be generalized where location information is obtained (such as to a city, ZIP code, or state level), so that a particular location of a viewer cannot be determined. Thus, the viewer 66 may control how information is collected about the viewer 66 and used by a server.

Figure 4A:
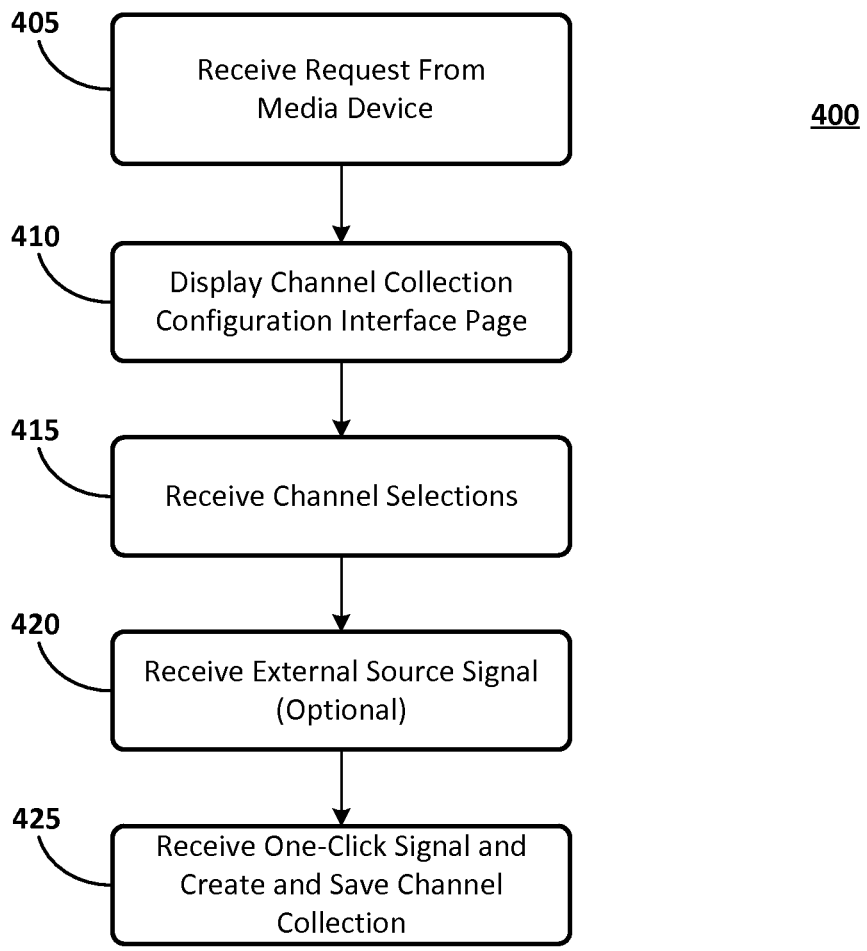
FIGS. 4A-4C illustrate example channel collection creation, maintenance, and subscription methods.
Figure 4B:
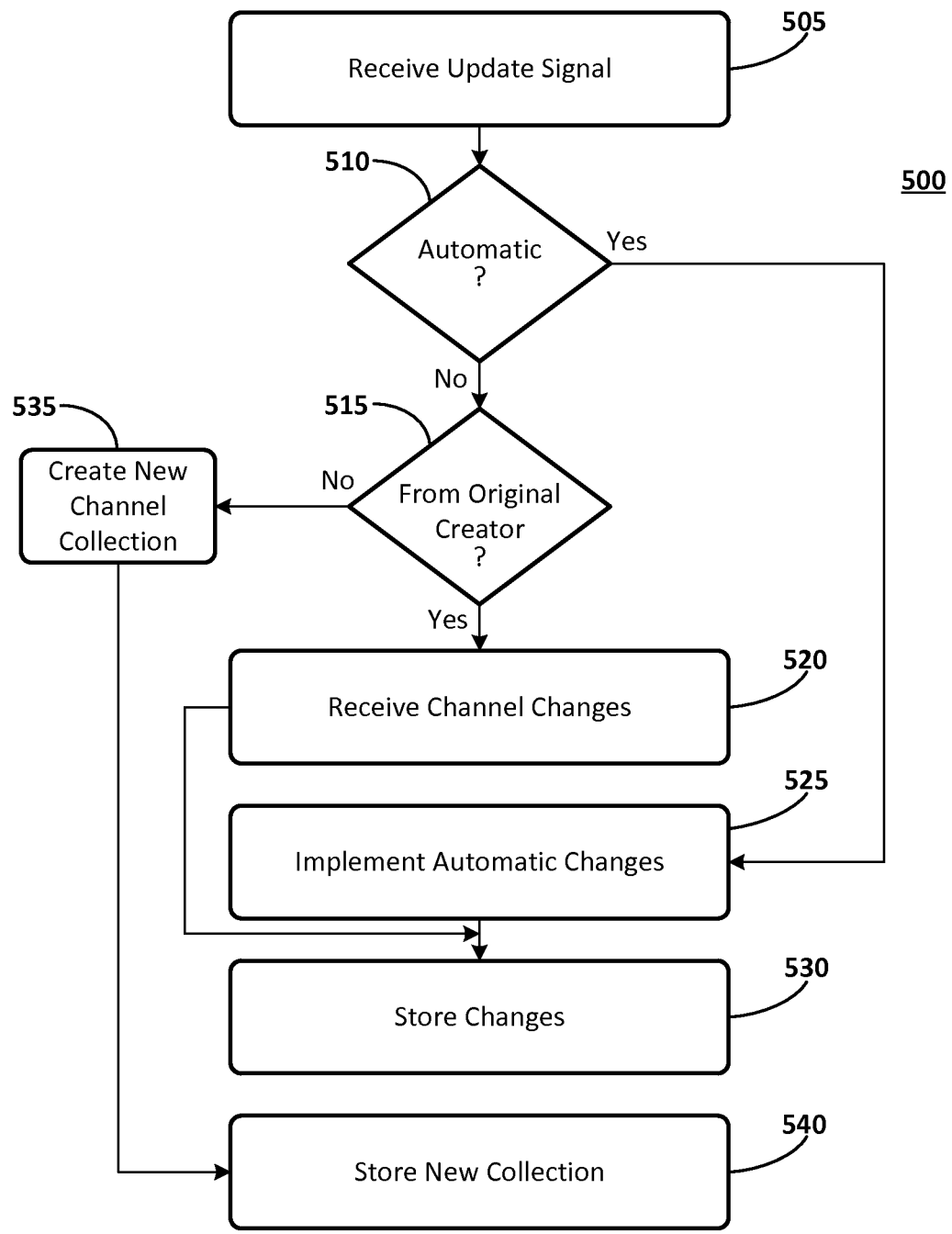
Figure 4C:
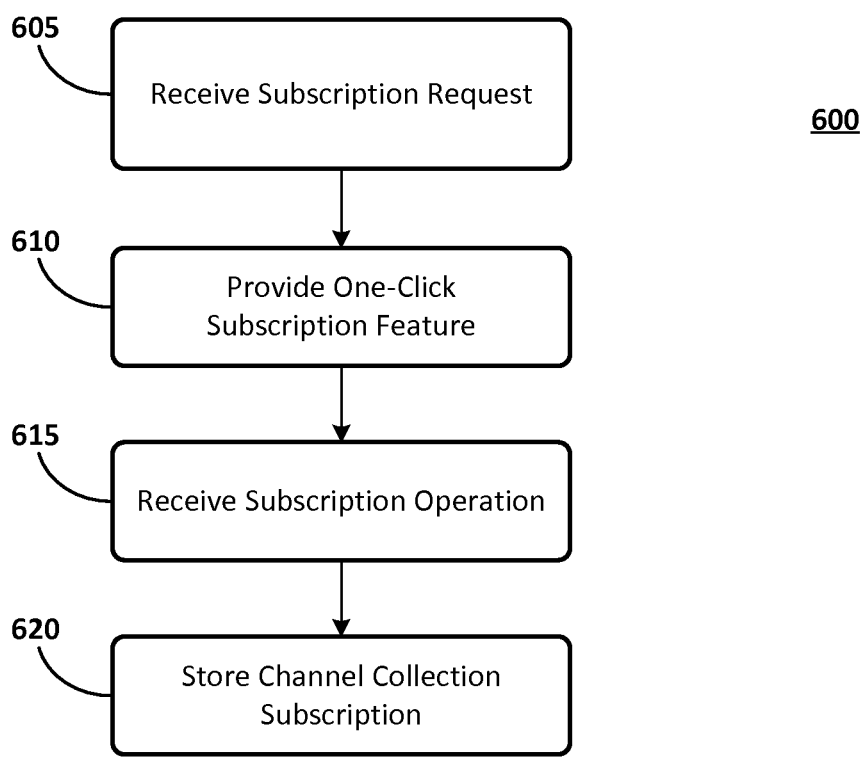

FIGS. 4A-4C illustrate example video channel collection creation, subscription, and curation methods. The methods of claims 4A-4C may be executed by processor 310 (FIG. 3A) on Web server 22 (FIG. 1), or another server, and by processor 270 (FIG. 3B).

FIG. 4A is a flowchart that illustrates an example method 400, which may be executed on a processor of Web server 22, for creating a channel collection. The method 400 begins in block 405 when the processor receives a request from a media device to display a channel configuration interface. The request may be initiated by operation of a single button on a channel home page, a video watch page, or other Web page. In block 410, the processor displays displaying a channel collection configuration interface that includes a channel selection field among other features, windows, pull down menus, and other interactive features.

In block 415, the processor receives two or more channel selections through the channel collection interface to populate a subscribable, syndicatable channel collection comprising multiple channels. In block 420, the processor receives a signal that updates to the channel collection are tied to an external information source, and that information from the external information source may trigger automatic updates to the channel collection by adding new channels and/or deleting existing channels. However, the method 400 may execute without this aspect, and a default manual update of the channel collection configuration then may be established. In block 425, the processor receives a channel collection creation signal, and responds with a channel collection creation operation that includes receiving a channel collection name for the channel collection, associating a unique address with the channel collection; and writing the unique address, the channel collection name, and metadata for each selected channel in the channel collection to a persistent data store. In an embodiment, the metadata may be a thumbnail image derived from a channel, an icon, or other image. Alternately or in addition, the metadata may include text related to the channel.

Following block 425, the method 400 ends.

FIG. 4B is a flowchart illustrating example channel collection update operations executed by the processor of Web server 22. In FIG. 4B, method 500 begins in block 505 when the processor receives a signal to update an existing channel collection. Such an update may take the form of a channel addition or a channel deletion.

In block 510, the processor determines if the update is an automatic update based on information from an external source. For example, the channel collection could be for the current (e.g., weekly) top-40 music video channels, and as each week passes the population of the channel collection may change. In block 510, if the update is automatic, the method 500 moves to block 525. If the update is not automatic, the method 500 moves to block 515.

In block 515, the processor determines if the update is being made by the original creator of the channel collection. If the change is being made by the original channel collection creation, the method 500 moves to block 520. If the change is being made by an individual other that the original content/channel collection creator, the method 500 moves to block 535.

In block 520, the processor receives the channel collection configuration changes. The method 500 then moves to block 530.

In block 525, the automatic changes are implemented in the channel collection. The method 500 then moves to block 530. In block 530, the changes are stored in the persistent store. Thereafter, all subscribers to the channel collection will receive and see the changed channel configuration of the channel collection.

In block 535, the processor receives the channel changes. Next in block 540, the processor saves the changed channel collection to the persistent store as a new subscribable, syndicatable channel collection linked to the viewer 66 who submitted the channel change.

Following either block 530 or 540, the method 500 ends.

FIG. 4C is a flowchart illustrating example method 600 for subscribing to a channel collection. The method 600 may be executed by the processor of the Web server 22. In block 605, the processor receives a subscription request from a media device. In block 610, the processor provides a channel collection subscription feature that allows a viewer 66 to subscribe to multiple channels using a simple, efficient process. In block 615, the processor receives a subscription operation from the viewer's media device and creates a channel collection subscription that includes all channels identified currently and in a future time to the channel collection, linked to the viewer's media device. In block 620, the processor stores the channel collection subscription in the persistent store. The process 600 then ends.

Certain of the devices shown in FIGS. 1, 3A, and 3B include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAM) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a flow chart and accompanying description to illustrate the embodiments represented in FIGS. 4A-4C. The disclosed devices, components, and systems contemplate using or implementing any suitable technique for performing the steps illustrated. Thus, FIGS. 4A-4C are for illustration purposes only and the described or similar steps may be performed at any appropriate time, including concurrently, individually, or in combination. In addition, many of the steps in the flow chart may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on computer storage medium for execution by one or more processors. A computer storage medium can be, or can be included in, a computer-readable storage device, a computer-readable storage substrate, or a random or serial access memory. The computer storage medium can also be, or can be included in, one or more separate physical components or media such as multiple CDs, disks, or other storage devices. The computer readable storage medium does not include a transitory signal.

The herein disclosed methods can be implemented as operations performed by a processor on data stored on one or more computer-readable storage devices or received from other sources.

A computer program (also known as a program, module, engine, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

We claim:

1. A system for creating and maintaining subscribable channel collections, comprising:
   a memory; and
   a processor, coupled to the memory, to:
      provide a channel collection configuration interface for presentation on a media device of a first user,
      receive two or more channel selections through the channel collection interface presented on the media device of the first user to populate a channel collection to comprise multiple channels, one or more of the multiple channels comprising multiple content items, in response to receiving a channel creation request of the first user, create a subscribable channel collection associated with the first user, and receive a subscription request from a media device of a second user for the subscribable channel collection associated with the first user, and create a channel collection subscription linked to the second user in response to the subscription request received from the media device of the second user for the subscribable channel collection associated with the first user.

2. The system of claim 1 further comprising a database storing a plurality of subscribable channels, each subscribable channel identified by a unique identifier.

3. The system of claim 1, wherein the channel collection configuration interface comprises a mobile application, and wherein the channel collection interface includes a channel selection field and a channel collection naming field.

4. The system of claim 1, wherein the content items in the channel collections comprise one or more of videos, animated media, still images, audio tracks, games, applications, mobile applications, Web sites, documents, social media posts, short message system (SMS) messages, emails, and blogs.

5. The system of claim 1, wherein to create the subscribable channel collection, the processor:

associates a unique address with the channel collection; and writes the unique address, a channel collection name, and thumbnail information for each selected channel in the subscribable channel collection to a persistent data store.

6. The system of claim 1, wherein the processor publicizes the subscribable channel collection to potential subscribers by providing channel collection subscription suggestions to social media contacts of existing subscribers.

7. The system of claim 1, wherein the processor:

receives an updated configuration of channels to the subscribable channel collection; and syndicates the update to all subscribers to the channel collection.

8. The system of claim 1, wherein receiving two or more channels comprises receiving channels split from an existing channel into the two or more separate channels.

9. A method, executed on a processor, for creating, maintaining, and syndicating a channel collection, comprising:

providing, by the processor, a channel collection configuration interface for presentation on a media device of a first user;

receiving, by the processor, two or more channel selections through the channel collection interface presented on the media device of the first user to populate a subscribable channel collection comprising multiple channels, one or more of the multiple channels comprising multiple content items;

executing, by the processor, a channel collection creation operation comprising:

associating, by the processor, a unique address with the channel collection, and writing, by the processor, the unique address and metadata for each selected channel in the channel collection to a persistent data store, the channel collection associated with the first user;

receiving, by the processor, a subscription request from a media device of a second user and using a subscription operation:

creating, by the processor, a channel collection subscription, comprising all channels identified currently and in a future time to the channel collection associated with the first user, the channel collection subscription linked to the second user, and storing, by the processor, the channel collection subscription linked to the second user in the persistent store;

receiving, by the processor, an updated configuration of channels to the channel collection associated with the first user; and automatically syndicating, by the processor, the update to the second user and other subscribers to the channel collection associated with the first user.

10. The method of claim 9, further comprising publicizing the channel collection to potential subscribers by providing channel subscription recommendations to social media contacts of existing subscribers.

11. The method of claim 9, wherein the channel collection is an original channel collection created by a first channel creator, the method further comprising;

receiving a channel addition to the original channel collection, the channel addition provided by a second channel creator;

creating a new channel collection comprising the original channel collection and the channel addition; and storing the new channel collection in the persistent store.

12. The method of claim 9, further comprising providing channel collection subscribers an option of not receiving automatic updates to the channel collection.

13. The method of claim 9, further comprising providing a channel subscription interface, the channel collection subscription interface including an identity of a channel collection and one or more of a number of current subscribers to the channel collection, a current number of likes or dislikes, a most recent update to the channel collection, whether the channel collection uses automatic updates, and contacts in a subscriber's social network who subscribe to the channel collection.

14. The method of claim 9, wherein receiving an updated configuration comprises receiving one or more of a channel addition, a channel deletion, a channel split, and a channel combination.

15. The method of claim 9, further comprising receiving a signal from a creator of the channel collection to block channel collection updates from other channel collection creators.

16. A non-transitory computer-readable storage medium having encoded thereon instructions executable by a processor to create, maintain, and syndicate a channel collection to a plurality of viewers, wherein the instructions when executed cause the processor to:

provide a channel collection configuration interface for presentation on a media device of a first user;

receive two or more channel selections through the channel collection interface presented on the media device of the first user to populate a channel collection, the channel collection comprising multiple channels, one or more of the multiple channels comprising multiple content items;

associate a unique address with the channel collection;

write the unique address and information for each selected channel in the channel collection to a persistent data store, the channel collection associated with the first user;

receive a subscription from a media device of a second user and create a channel subscription linked to the second user;

receive an updated configuration of channels to the channel collection associated with the first user; and make the update available to the second user and other subscribers to the channel collection associated with the first user.

17. The computer-readable storage medium of claim 16, wherein the processor operates to publicize the channel collection to potential subscribers, comprising:

providing channel collection subscription suggestions to individuals accessing content in the persistent store; and providing channel collection subscription suggestions to social media contacts of existing subscribers.

18. The computer-readable medium of claim 16, wherein the update to the channel configuration comprises one of splitting an existing channel into two or more channels and merging two or more channels into one channel.

19. The computer-readable medium of claim 16, wherein the processor operates to:

monitor updates to individual channels in the channel collection; and suggest for deletion, channels that have not been updated within a specified time.

20. The computer-readable medium of claim 16, wherein the processor operates to:

provide an affinity score of the channel collection based on subscriber inputs, and suggest to a creator of the channel collection, channel changes to improve the affinity score of the channel collection.

* * * * *